United States Patent
Zhang

(10) Patent No.: US 11,227,085 B2
(45) Date of Patent: Jan. 18, 2022

(54) METHOD AND OPERATION METHOD FOR DISPLAYING DRC IN CLASSIFICATION MANNER IN PCB DESIGN

(71) Applicant: ZHENGZHOU YUNHAI INFORMATION TECHNOLOGY CO., LTD., Henan (CN)

(72) Inventor: Min Zhang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 607 days.

(21) Appl. No.: 16/097,206

(22) PCT Filed: Dec. 28, 2017

(86) PCT No.: PCT/CN2017/119269
§ 371 (c)(1),
(2) Date: Oct. 26, 2018

(87) PCT Pub. No.: WO2019/029107
PCT Pub. Date: Feb. 14, 2019

(65) Prior Publication Data
US 2021/0224446 A1    Jul. 22, 2021

(30) Foreign Application Priority Data
Aug. 10, 2017 (CN) .......................... 201710680675.9

(51) Int. Cl.
*G06F 30/31* (2020.01)
*G06F 30/398* (2020.01)
(Continued)

(52) U.S. Cl.
CPC ............ *G06F 30/31* (2020.01); *G06F 30/398* (2020.01); *H05K 3/0005* (2013.01); *G06F 2111/16* (2020.01); *G06F 2115/12* (2020.01)

(58) Field of Classification Search
CPC .... G06F 30/31; G06F 30/398; G06F 2115/12; G06F 2111/16; G06F 115/12; G06F 111/16; H05K 3/0005; H05K 3/00
See application file for complete search history.

(56) References Cited

U.S. PATENT DOCUMENTS

| 7,379,175 B1 * | 5/2008 | Stokowski ....... G01N 21/95607 356/237.5 |
| 2004/0162715 A1 * | 8/2004 | Frank ..................... G06F 30/398 703/14 |
| 2018/0121594 A1 * | 5/2018 | Studders ................. G06F 30/33 |

FOREIGN PATENT DOCUMENTS

| CN | 105787148 A | 7/2016 |
| CN | 107480369 A | 12/2017 |

OTHER PUBLICATIONS

International Search Report for PCT/CN2017/119269 dated May 18, 2018, ISA/CN.

(Continued)

*Primary Examiner* — Vuthe Siek
(74) *Attorney, Agent, or Firm* — Yue (Robert) Xu; Apex Attorneys at Law, LLP

(57) ABSTRACT

A design method for displaying a DRC in a classification manner in a PCB design is provided. The design method includes: acquiring layer information contained in a current design, adding the acquired layer information to a DRC Layer menu in a pop up window, acquiring a DRC Type contained in the current design and adding the processed DRC Type to a DRC Type menu in the pop up window after processing the acquired DRC Type; creating an updating function, to update a DRC Type menu list in response to an input action of a user; acquiring an attribute of each item in a DRC Layer menu list and the DRC Type menu list, and (Continued)

inserting the acquired attribute into the updated DRC Layer menu list and the updated DRC Type menu list, to form a feature parameter list.

10 Claims, 6 Drawing Sheets

(51) Int. Cl.
*G06F 115/12* (2020.01)
*G06F 111/16* (2020.01)
*H05K 3/00* (2006.01)

(56) References Cited

OTHER PUBLICATIONS

Feng Guochen etc. A Common Integrated Circuit Design Rule Checking; Microelectronics & Computer; Issue No. 6, vol. 2001, Sects. 2-3.

\* cited by examiner

METHOD AND OPERATION METHOD FOR DISPLAYING DRC IN CLASSIFICATION MANNER IN PCB DESIGN

The present application is a National phase application of PCT international patent application PCT/CN2017/119269, filed on Dec. 28, 2017 which claims the priority to Chinese Patent Application No. 201710680675.9 titled "DESIGN METHOD AND OPERATION METHOD FOR DISPLAYING DRC IN CLASSIFICATION MANNER IN PCB DESIGN", filed with the Chinese Patent Office on Aug. 10, 2017, both of which are incorporated by reference in their entireties herein.

FIELD

The disclosure relates to the technical field of PCB, and particularly to a design method and an operation method for displaying a DRC in a classification manner in a PCB design.

BACKGROUND

At present, there are multiple types of PCB design software on a market. Cadence, as the most widely applied software in the industry, not only has powerful functions and is supported by multiple types of other relevant software, Cadence also provides an open secondary development interface and a complete development language library. Therefore, users can carry out development according to their own needs. Skill language is a high-level programming language built in Cadence software based on C language and LISP language. Moreover, Cadence provides abundant interactive functions for the skill language. Accordingly, conducting research on the skill language to write a tool and putting the tool into application can improve greatly work efficiency.

In a later period of PCB design, an engineer checks and modifies DRCs one by one. DRC refers to a Design Rule Check. Specifically, the software automatically performs check and generation according to rules set by the engineer in an initial period to identify contents that are not in conformity with the rules. Therefore, in a later period of PCB design, the engineer has to check and modify the DRCs. There are many DRC types and a great number of DRCs, where certain types of DRCs with a great influence on design have to be modified, while some types of DRCs may be modified or not. In a case that the DRCs are contradictory to each other and fail to satisfy requirements simultaneously, the DRCs are required to be checked to achieve a trade-off between attributes of the DRCs. For this reason, it is essential to check and modify the DRCs in the later period of PCB design.

In a conventional technical solution, a DRC list generated by Allegro software is checked, and whether a modification is made is determined after states of all DRCs are checked. The DRC list is disorderly and unclearly classified. Consequently, the DRC list cannot provide a grouping mode, or check the DRCs at a certain layer and a certain type of the DRCs. In this case, the DRC list is inconvenient to be used, and it is impossible to perform large-scale checking according to a certain priority but prone to miss key DRCs.

SUMMARY

An object of the present disclosure is to provide a design method and an operation method for displaying a DRC in a classification manner in a PCB design, to solve an issue that a certain type of DRCs in the PCB design cannot be checked concisely and effectively.

In order to achieve the above objects, the present disclosure provides the following technical solutions.

A design method for displaying a DRC in a classification manner in a PCB design is provided. The method includes: acquiring layer information contained in a current design, adding the acquired layer information to a DRC Layer menu in a pop up window, acquiring a DRC Type contained in the current design and adding the processed DRC Type to a DRC Type menu in the pop up window after processing the acquired DRC Type; creating an updating function, to update a DRC Type menu list in response to an input action of a user; acquiring an attribute of each item in a DRC Layer menu list and the DRC Type menu list, and inserting the acquired attribute into the updated DRC Layer menu list and the updated DRC Type menu list, to form a feature parameter list; and matching an object selected from a DRC list with a DRC in the current design by matching a coordinate feature and a layer feature.

In an embodiment, the acquiring the layer information contained in the current design and adding the acquired layer information to the DRC Layer menu in the pop up window may include: acquiring stack information of a circuit board in the current design, acquiring the layer information with no repeating contents in the current design through a deduplication function, and adding the acquired layer information to the DRC Layer menu list in the pop up window.

In an embodiment, the acquiring the DRC Type contained in the current design and adding the processed DRC Type to the DRC Type menu in the pop up window after processing the acquired DRC Type may include: traversing all DRCs contained in the current design layer-by-layer, acquiring DRC Type information with no repeating contents in the current design through a deduplication function, and adding the acquired type information to the DRC Type menu list.

In an embodiment, the traversing all the DRCs contained in the current design layer-by-layer may include: accessing a DRC attribute of a database identifier in the current design to acquire all the DRCs in the current design, and traversing the DRCs at all layers to acquire a type attribute of the DRC.

In an embodiment, before the acquiring the layer information contained in the current design, adding the acquired layer information to the DRC Layer menu in the pop up window, acquiring the DRC Type contained in the current design and adding the processed DRC Type to the DRC Type menu in the pop up window after processing the acquired DRC Type, the design method may further include: writing a pop up window definition code into a file, and creating a window body and displaying the pop up window by invoking the file with the pop up window definition code via a function.

In an embodiment, before the creating the updating function, the design method may further include: monitoring a state of a control in the pop up window and acquiring the input action of the user.

In an embodiment, the input action of the user may include selecting options in the DRC Layer menu list and the DRC Type menu list, and clicking a button of the control in the pop-up window.

In an embodiment, the creating the updating function to update the DRC Type menu list in response to the input action of the user may include: screening out an object to be highlighted in response to the input action of the user, and adding the screened object to the DRC Type menu list for clicking.

In an embodiment, the matching the object selected from the DRC list with the DRC in the current design by matching the coordinate feature and the layer feature may include: acquiring a feature value of the coordinate and the layer of the current DRC; comparing the feature value of the current DRC with feature values of all DRCs in a feature list constructed for all the DRCs in the current design; determining whether the feature value of the current DRC is equal to feature values in the feature list; and determining the current DRC and the DRC in the feature list to be the same object in the case that it is determined that the feature value of the current DRC is equal to the feature value in the feature list, to realize precise positioning.

An operation method for displaying a DRC in a classification manner in a PCB design is provided. The method includes: loading and invoking software by a function; acquiring a DRC list of self-definition classification according to layers and types in a pop up window; and acquiring DRC details via a pop up window control according to an item in the DRC list.

Effects provided in the summary of the present disclosure are only effects of embodiments, rather than all the effects of the present disclosure. One of the above technical solutions has the following advantages or beneficial effects:

1. In the present disclosure, the DRCs can be displayed in a classification manner according to both or either of the type and the layer of the DRC, thereby solving problems in the conventional technical solution that the check is inconvenient, a check priority cannot be determined and the check cannot be performed based on the classification due to an excessively long DRC list, and improving greatly the work efficiency. Accordingly, a bug of failing to modify an important DRC is avoided to a certain extent, and the design quality is ensured.

2. In the present disclosure, the DRC is matched with an item in the list by matching the coordinate feature and the layer feature, to avoid a failure in precise positioning in the case of matching based on an identifier, due to a change of the identifier after refreshing the list in the pop up window. By recording multiple features such as coordinates and layers of an object, features of an object in a list are acquired after clicking the list; and the features the object are compared with features in a feature list constructed for all objects in the design to achieve design interface jump and enlargement after precise positioning, for checking details.

BRIEF DESCRIPTION OF THE DRAWINGS

Drawings described here to further illustrate the present disclosure constitute a part of the present application. Exemplary embodiments and descriptions thereof in the present disclosure are intended to illustrate the present disclosure, but do not constitute a limitation on the present disclosure. In the drawings.

DETAILED DESCRIPTION OF THE EMBODIMENTS

In order to clearly describe technical features of the solution, the present disclosure is described in detail by referring to drawings in combination with embodiments. It should be noted that embodiments of the present disclosure and features in the embodiments may be combined together provided that no conflicts are thus incurred. The disclosure below provides many different embodiments or examples to implement different structures of the present disclosure. In order to simplify the present disclosure, parts and arrangement of a particular example are described. Besides, reference may be repeatedly made to numerals and/or letters in different examples of the present disclosure. Such repetition is just for simplification and clarity, and the repetition itself does not indicate a relationship of embodiments and/or a relationship of arrangements discussed. It should be noted that parts illustrated in drawings are not necessarily drawn to scale. In the present disclosure, known assemblies, processing techniques and processes are not described to avoid unnecessary limitation on the present disclosure.

First Embodiment

Figure 1:
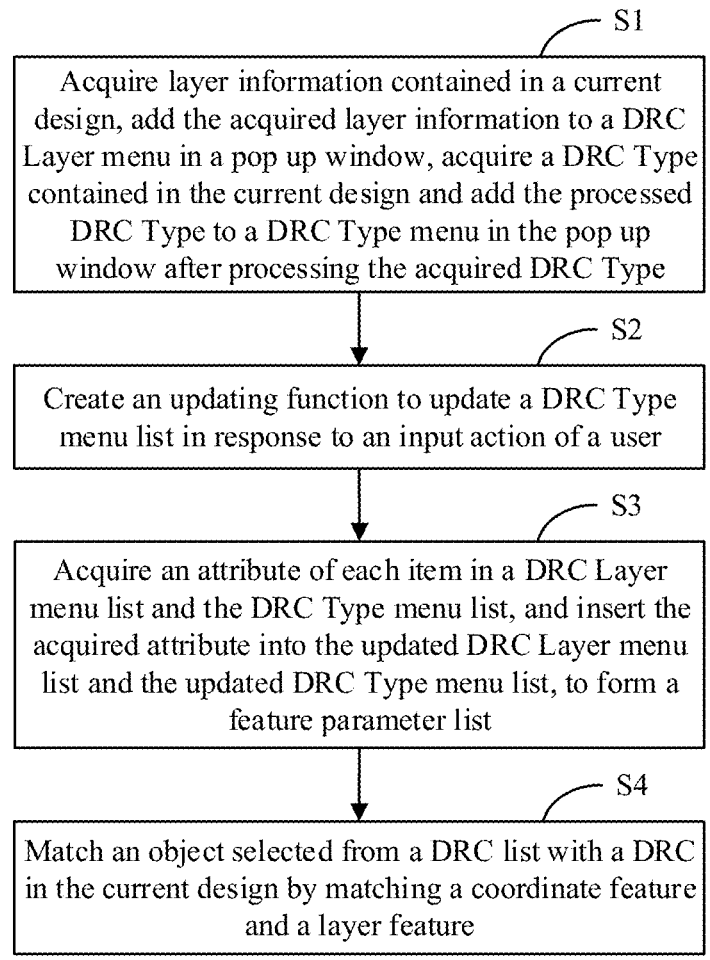
FIG. 1 is a flow chart of a design method for displaying a DRC in a classification manner according to a first embodiment of the present disclosure.

A design method for displaying a DRC in a classification manner in a PCB design is provided as shown in FIG. 1. The method includes the following steps S1 to S4.

In step S1, layer information contained in a current design is acquired and the acquired layer information is added to a DRC Layer menu in a pop up window; and a DRC Type contained in the current design is acquired and the processed DRC Type is added to a DRC Type menu in the pop up window after processing the acquired DRC Type.

In step S2, an updating function is created to update a DRC Type menu list in response to an input action of a user.

In step S3, an attribute of each item in a DRC Layer menu list and the DRC Type menu list is acquired, and the acquired attribute is inserted into the updated DRC Layer menu list and the updated DRC Type menu list, to form a feature parameter list.

In step S4, an object selected from a DRC list is matched with a DRC in the current design by matching a coordinate feature and a layer feature.

Second Embodiment

Figure 2:
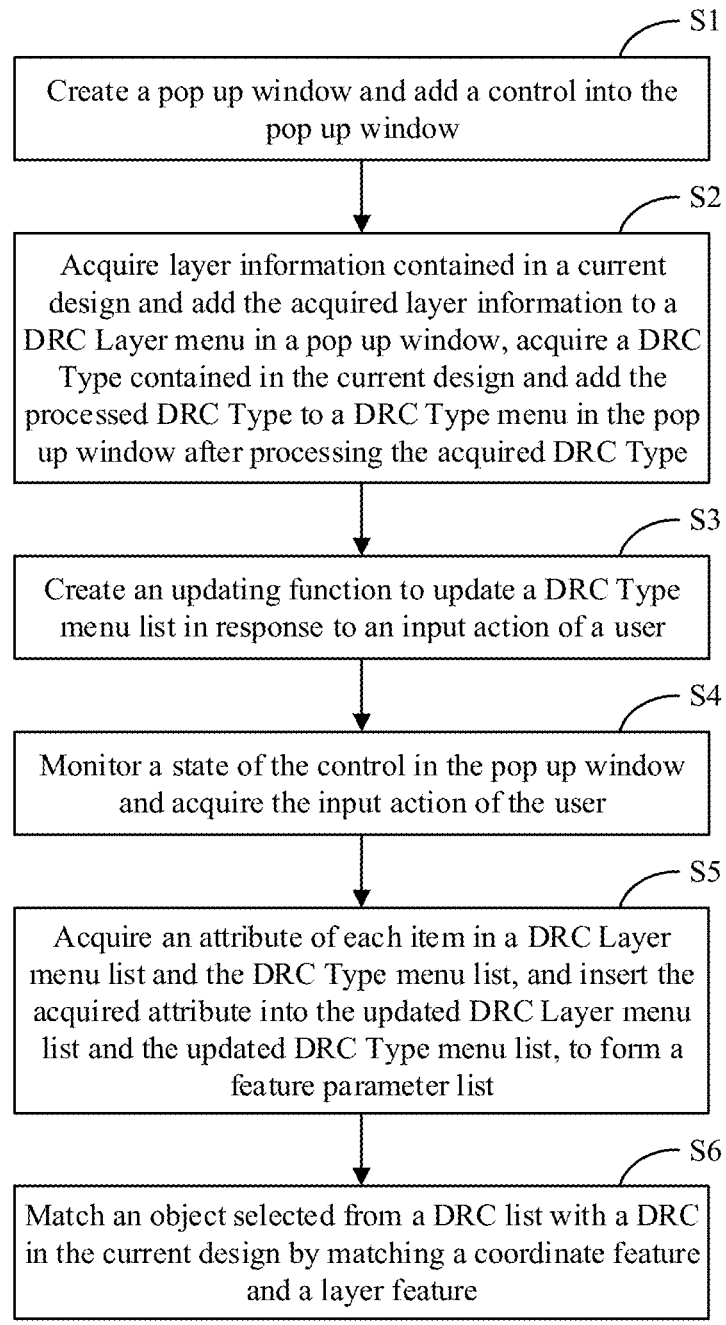
FIG. 2 is a flow chart of a design method for displaying a DRC display in a classification manner according to a second embodiment of the present disclosure.

A design method for displaying a DRC in a classification manner in a PCB design is provided as shown in FIG. 2. The method includes the following steps S1 to S6.

In step S1, a pop up window is created and a control is added to the pop up window.

In step S2, layer information contained in a current design is acquired and the acquired layer information is added to a DRC Layer menu in the pop up window; and a DRC Type contained in the current design is acquired and the processed DRC Type is added to a DRC Type menu in the pop up window after processing the acquired DRC Type.

In step S3, a state of the control in the pop up window is monitored and an input action of a user is acquired.

In step S4, an updating function is created to update a DRC Type menu list in response to the input action of the user.

In step S5, an attribute of each item in a DRC Layer menu list and the DRC Type menu list is acquired, and the acquired attribute is inserted into the updated DRC Layer menu list and the updated DRC Type menu list, to form a feature parameter list.

In step S6, an object selected from a DRC list is matched with a DRC in the current design by matching a coordinate feature and a layer feature.

In step S1, controls such as a button and a textbox are added at the time of creating a window body, and the controls are configured for inputting. Creation and display of the pop up window is a process of writing, reading and operating a file. The software is capable of identifying a file with a special format, and the pop up window may be created and displayed by invoking this file via a dedicated function. Moreover, contents of the file are definition codes of the pop up window, and each control in the pop up window has a particular definition mode. Controls refer to various elements constituting an interface of the pop up window, such as a button, a list and a selection box. In addition, forms and functions of each element are defined, such as a type, a position, a size and a color. Taking the button as an example, essential definitions are listed, and personalized contents such as the color are excluded: a. defining the type as button; b. defining positional coordinates; c. defining the size, including a length and a width; and d. defining contents to be displayed.

To sum up, the creating of the pop up window includes steps as follows.

a. a file read-write port is opened.

b. a file is created.

c. a pop up window definition code is written into the file created in step b, to define a type, a position, a size and a color, etc. of each control in a pop up window.

d. the file is invoked by a dedicated function axlForm-Create to create a window body.

e. the pop up window is displayed in the design by a dedicated function axlFormDisplay.

f. the file read-write port is closed.

In step S2, creating a pull-down menu includes acquiring information of the current design, and inserting the processed information into the menu after processing the acquired information. A layer of the current design is established at an initial period of the design, and thus both the number of layers in a circuit board and the layers functioning as a power supply, etc. remain unchanged in a normal design. However, a DRC is a check conducted by the software based on the action of the user and thus the DRC changes dynamically.

All layers in the current design are included in the DRC Layer menu, and pull-down menus in different designs have different numbers of layers. Stack information of a circuit board in the current design is acquired through a function, and the layer information with no repeating contents in the current design is acquired through a unique deduplication function, and the acquired layer information is added to the DRC Layer menu in the pop up window.

All DRC types of the current design are included in the DRC Type menu. All the DRCs contained in the current design are traversed layer-by-layer, a DRC attribute of a database identifier in the current design is accessed to acquire all the DRCs in the current design. The DRCs at all layers are traversed to acquire a type attribute of the DRC. DRC Type information with no repeating contents in the current design is acquired through the unique deduplication function, and the acquired type information is added to the DRC Type menu list.

In step S3, controls in the pop up window are continuously monitored to monitor external input and capture the action of the user. The action of the user includes selecting options in the DRC Layer menu list and the DRC Type menu list and clicking the button UP, DOWN or UPDATE in the pop up window. All objects in the pop up window are referred to as controls and an action of the user for a control can be monitored.

In step S4, an updating function is created to update the DRC list, where actions such as selecting items from two pull-down menus and clicking the button UP, DOWN or UPDATE that are monitored in step 3 are capable of invoking the updating function to refresh the type. In addition, an object to be highlighted is screened out in response to the input action of the user, and the screened object is added to the DRC Type menu list for clicking.

In step S5, the attributes of items in the DRC list constructed in step S4 are successively acquired and the acquired attributes are inserted into the list in the pop up window. The attribute refers to a set value, an actual value, a type name and the coordinates and so on shown in FIG. 3.

The object is matched with the item in the list, which involves an object identifier. In the software, each object has its own unique database identifier. The identifier is also referred to as id that remains unchanged in a particular period and is used to record and distinguish the objects.

However, id may be refreshed in certain conditions, and the id redistributed is different from the original id. In the present disclosure, the id inserted into the list is refreshed, resulting in that neither does the item clicked by a mouse match with the id in the original id list, nor enlargement is implemented to check relevant details.

In step S6, other matching methods are adopted. By recording multiple features such as coordinates and layers of the object, features of items in the list are acquired after clicking the list; and these features are compared with features in the feature list constructed for all objects in the design, so as to achieve design interface jump and enlargement after precise positioning to check relevant details.

Figure 3:
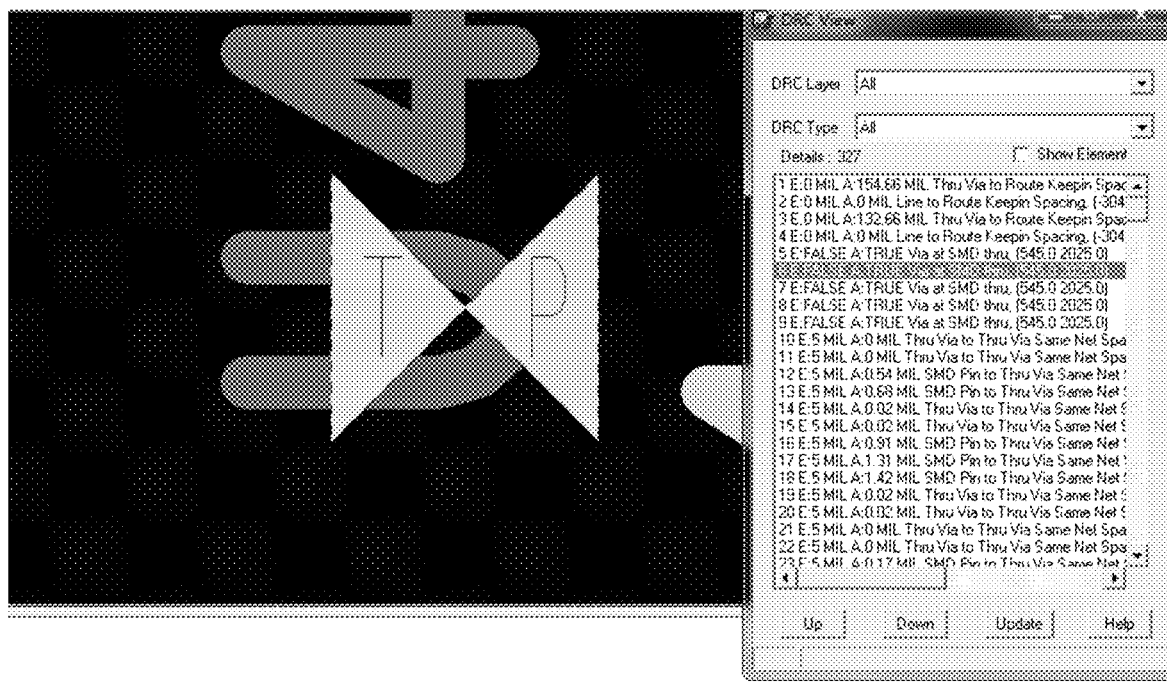
FIG. 3 is a diagram showing an effect of clicking to enlarge a design and arranging an object clicked in a center of the design according to the present disclosure.

Pull-down menus in different designs have different numbers of layers. All DRC types in the current design are included in the DRC Type menu. Contents of the menu are formed by types acquired one by one by traversing all the DRCs in the current design. The list has a jump function. Therefore, the design is enlarged after clicking and the object clicked is arranged in the center of the design, as shown in FIG. 3.

Figure 4:
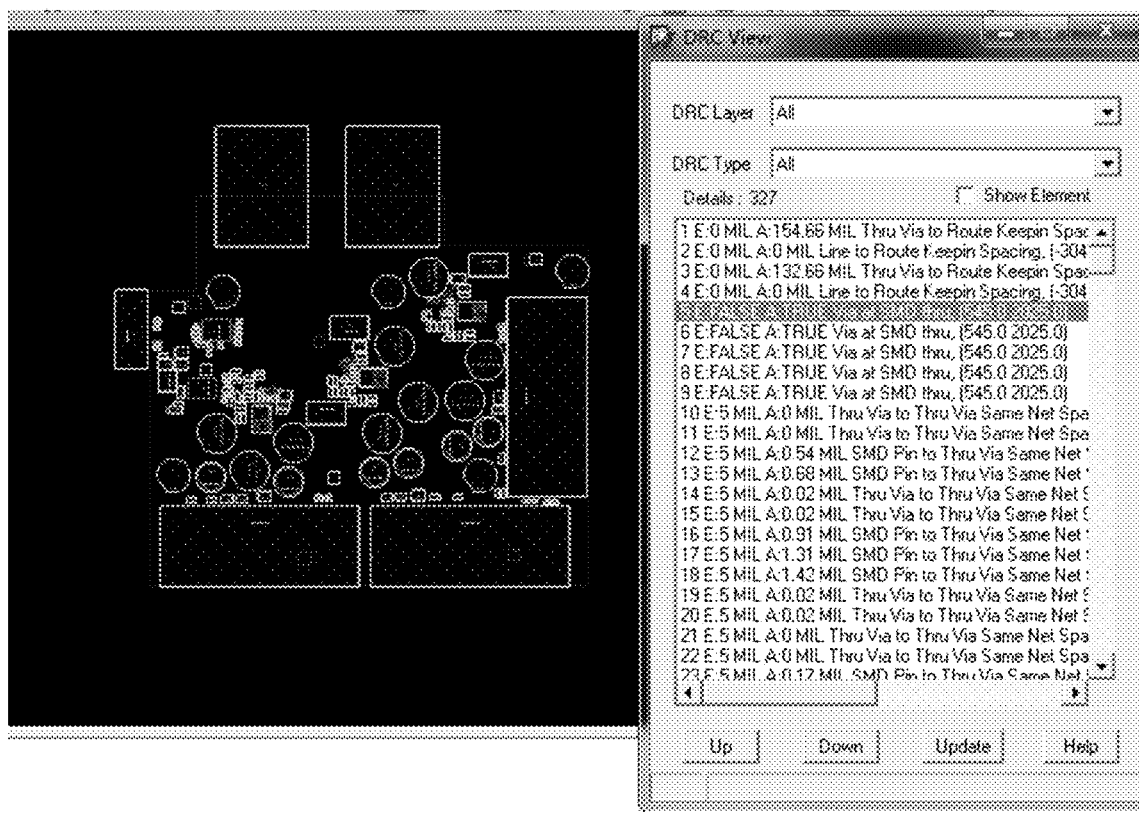
FIG. 4 is a first diagram showing an operation effect of the method for displaying the DRC in a classification manner according to the present disclosure.

As shown in FIG. 4, the number of the DRCs in the current design is 327 in total. In the case that the attribute selected for DRC Layer is ALL and the attribute selected for DRC Type is ALL, such two pull-down menus cover all situations, and all layers in the current design are included in the DRC Layer menu.

Figure 5:
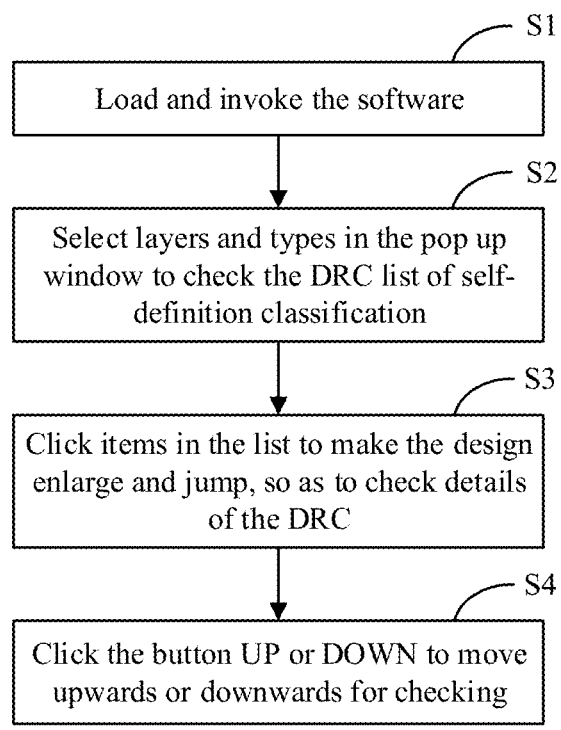
FIG. 5 is a flow chart of an operation method for displaying a DRC display in a classification manner in a PCB design according to the present disclosure.

An application method of displaying a DRC in a classification manner in a PCB design is provided as shown in FIG. 5. The method includes the following steps S1 to S4.

In step S1, software is loaded and invoked. Specifically, skill load ("drcshow.il") is input into a command line of the software Allegro, where drcshow.il is a source program file and this action is conducted to load the program. Then, drcshow is input into the command line, where drcshow is the program command, and this action is conducted to invoke the program.

In step S2, layers and types are selected in the pop up window to check the DRC of self-definition classification.

In step S3, items in the list are clicked to make the design enlarge and jump, so as to check details of the DRC.

In step S4, the button UP or DOWN may be clicked to move upwards or downwards for check; or the items may be directly clicked by the mouse.

Figure 6:
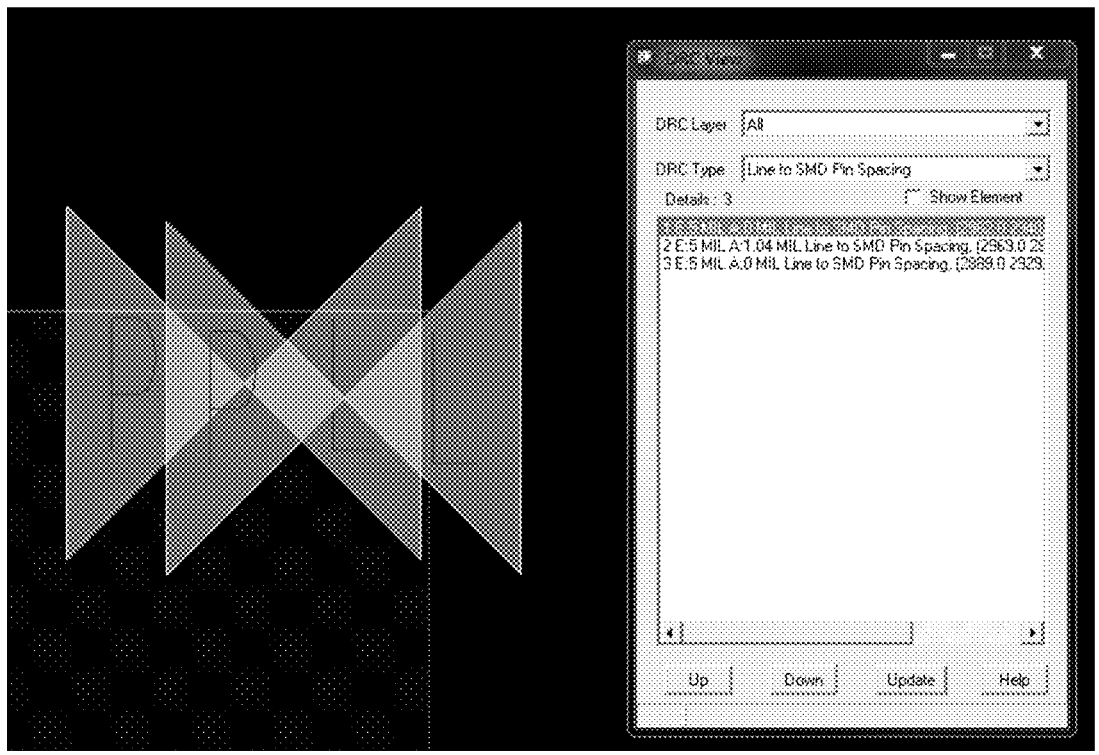
FIG. 6 is a second diagram showing an operation effect of the method for displaying the DRC in a classification manner.

According to the above steps, the DRCs are displayed in a classification manner. The implementation results are shown in FIG. 6.

Although embodiments of the present disclosure are described above in combination with drawings, the embodiments are not intended to limit the protection scope of the present disclosure. For those skilled in the art, it should be understood that modifications or changes can be made by those skilled in the art without exercise of creative work based on the technical solutions of the present disclosure, and the modifications or changes fall within the protection scope of the present disclosure.

The invention claimed is:

1. A method for displaying a DRC in a PCB design, comprising:
    acquiring layer information contained in a current design, adding the acquired layer information to a DRC Layer menu in a pop up window, acquiring a DRC Type contained in the current design, processing the acquired DRC type, and adding the processed DRC Type to a DRC Type menu in the pop up window after processing the acquired DRC Type;
    creating an updating function, to update a DRC Type menu list in response to an input action of a user;
    acquiring an attribute of each item in a DRC Layer menu list and the DRC Type menu list, and inserting the acquired attribute into the updated DRC Layer menu list and the updated DRC Type menu list, to form a feature parameter list; and
    matching an object selected from a DRC list with a DRC in the current design by matching a coordinate feature and a layer feature.

2. The method for displaying the DRC in the PCB design according to claim 1, wherein the acquiring the layer information contained in the current design and adding the acquired layer information to the DRC Layer menu in the pop up window comprises: acquiring stack information of a circuit board in the current design, acquiring the layer information with no repeating contents in the current design through a deduplication function, and adding the acquired layer information to the DRC Layer menu in the pop up window.

3. The method for displaying the DRC in the PCB design according to claim 1, wherein the acquiring the DRC Type contained in the current design and adding the processed DRC Type to the DRC Type menu in the pop up window after processing the acquired DRC Type comprises: traversing all DRCs contained in the current design layer-by-layer, acquiring DRC Type information with no repeating contents in the current design through a deduplication function, and adding the acquired type information to the DRC Type menu list.

4. The method for displaying the DRC in the PCB design according to claim 3, wherein the traversing all DRCs contained in the current design layer-by-layer comprises: accessing a DRC attribute of a database identifier in the current design to acquire all the DRCs in the current design, and traversing the DRCs at all layers to acquire a type attribute of the DRC.

5. The method for displaying the DRC in the PCB design according to claim 1, wherein before the acquiring the layer information contained in the current design, adding the acquired layer information to the DRC Layer menu in the pop up window, acquiring the DRC Type contained in the current design and adding the processed DRC Type to the DRC Type menu in the pop up window after processing the acquired DRC Type, the method further comprises:
    writing a pop up window definition code into a file; and
    creating a window body and displaying the pop up window by invoking the file with the pop up window definition code via a function.

6. The method for displaying the DRC in the PCB design according to claim 1, wherein before the creating the updating function, the design method further comprises: monitoring a state of a control in the pop up window and acquiring the input action of the user.

7. The method for displaying the DRC in the PCB design according to claim 6, wherein the input action of the user comprises selecting options in the DRC Layer menu list and the DRC Type menu list, and clicking a button of the control in the pop-up window.

8. The method for displaying the DRC in the PCB design according to claim 1, wherein the creating the updating function to update the DRC Type menu list in response to the input action of the user comprises:
    screening out an object to be highlighted in response to the input action of the user, and adding the screened object to the DRC Type menu list for clicking.

9. The method for displaying the DRC in the PCB design according to claim 1, wherein the matching the object selected from the DRC list with the DRC in the current design by matching the coordinate feature and the layer feature comprises:
    acquiring a feature value of the coordinate and the layer of the current DRC; comparing the feature value of the current DRC with feature values of all DRCs in a feature list constructed for all the DRCs in the current design; determining whether the feature value of the current DRC is equal to feature values in the feature list; and determining the current DRC and the DRC in the feature list to be the same object in the case that it is determined that the feature value of the current DRC is equal to the feature value in the feature list, to realize precise positioning.

10. A method for displaying a DRC in a PCB design according to claim 1, further comprising:
    loading and invoking software by a function;
    acquiring a DRC list of self-definition classification according to layers and types in a pop up window; and
    acquiring DRC details via a pop up window control according to an item in the DRC list.

* * * * *